(12) United States Patent
Majka (10) Patent No.: US 8,000,854 B2
(45) Date of Patent: Aug. 16, 2011

(54) SYSTEM AND METHOD FOR TRANSITIONING MAPS ON AERONAUTICAL DISPLAY

(75) Inventor: Matthew T. Majka, Parker, CO (US)

(73) Assignee: The Boeing Company, Chicago, IL (US)

( * ) Notice: Subject to any disclaimer, the term of this patent is extended or adjusted under 35 U.S.C. 154(b) by 1142 days.

(21) Appl. No.: 11/742,175

(22) Filed: Apr. 30, 2007

(65) Prior Publication Data

US 2008/0269964 A1 Oct. 30, 2008

(51) Int. Cl.
*G08G 5/00* (2006.01)
(52) U.S. Cl. .......................... 701/30; 244/81
(58) Field of Classification Search .................. 701/1, 4, 701/8, 9, 16, 18, 200, 211, 207, 208, 212; 340/963, 970, 947, 951; 342/33–35; 73/178 T; 345/637, 639, 640, 660; 244/76, 81, 93, 244/100, 103
See application file for complete search history.

(56) References Cited

U.S. PATENT DOCUMENTS

| | | | |
|---|---|---|---|
| 5,519,392 A | 5/1996 | Oder et al. | |
| 6,606,563 B2 * | 8/2003 | Corcoran, III | 701/301 |
| 6,895,331 B2 | 5/2005 | Yoshida | |
| 6,927,782 B2 | 8/2005 | Coldefy et al. | |
| 7,023,456 B2 | 4/2006 | Huber et al. | |
| 7,506,837 B2 * | 3/2009 | Parks | 244/7 B |
| 7,702,461 B2 * | 4/2010 | Conner et al. | 701/301 |
| 2002/0099528 A1 * | 7/2002 | Hett | 703/13 |

* cited by examiner

*Primary Examiner* — Dalena Tran
(74) *Attorney, Agent, or Firm* — Harness, Dickey & Pierce, P.L.C.

(57) ABSTRACT

A system for transitioning navigation data on a mobile platform (such as a train, ship, aircraft or automobile) is provided. The system includes a source of navigation display data and an image control module. The image control module generates image data from the navigation display data based on a position of the mobile platform. The image data includes at least one first navigation display data at a first opacity and at least one second navigation display data at a second opacity. The second opacity is computed based on the position of the mobile platform. The system also includes a display device disposed within the mobile platform that displays the image data.

19 Claims, 11 Drawing Sheets

SYSTEM AND METHOD FOR TRANSITIONING MAPS ON AERONAUTICAL DISPLAY

FIELD

The present disclosure relates generally to aeronautical displays for use with mobile platforms, and more particularly to a system and method for transitioning maps on an aeronautical display.

BACKGROUND

The statements in this section merely provide background information related to the present disclosure and may not constitute prior art.

Many mobile platforms (such as trains, ships, aircraft and automobiles) employ geographical maps to guide the mobile platform from an origination point to a destination. For example, aeronautical maps are employed in the operation and navigation of commercial passenger aircraft. Generally, the aeronautical maps employed to navigate commercial passenger aircraft are loaded from a database onto an electronic display based on a user input.

Typically, an aeronautical map provided on the electronic display contains a small fraction of a geographic region so that the map contains the detail necessary for the navigation of the aircraft through that region. In addition, different maps may be used to show the approach, take-off and other characteristics of the departure or arrival airport, but user interaction is required to transition between the desired maps. Thus, operators of the aircraft have to manually switch between multiple maps when navigating the aircraft, which may be distracting.

Accordingly, it would be desirable to provide a system and method for automatically transitioning a map on an aeronautical display that would reduce the need for manually switching between various aeronautical maps on the aeronautical display.

SUMMARY

A system for transitioning navigation display data on a mobile platform is provided. The system includes a source of navigation data and an image control module. The image control module generates image data from the navigation display data based on a position of the mobile platform. The image data includes at least one first navigation data at a first opacity and at least one second navigation display data at a second opacity. The second opacity is computed based on the position of the mobile platform. The system also includes a display device disposed within the mobile platform that displays the image data.

In one implementation, a method of transitioning navigation data on a display of an aircraft is provided. The method includes computing a location of the aircraft relative to an origin or a destination of the aircraft, and rendering a first image on the display at a first opacity based on the location of the mobile platform. The method also includes determining a speed of the aircraft and if the aircraft is on a ground surface. The method further comprises transitioning to a second image on the display at a second opacity based on at least one of the speed of the aircraft and whether the aircraft is on the ground surface. The method includes computing the second opacity based at least on a speed of the aircraft on the ground surface.

The present teachings also involve an aircraft that comprises a fuselage and one or more wheels coupled to the fuselage to support the fuselage on a ground surface. The aircraft also includes a cockpit located within the fuselage and a display located within the cockpit. The display is controlled by a display control system. The display control system includes a position control module that computes position data for the aircraft. The position data includes at least one of a speed of the aircraft, and a weight of the aircraft on the one or more wheels of the aircraft. The system also includes an image control module that generates image data for display on the display based on the position data. The image data includes at least one navigation display data for display at an opacity computed based on the position of the aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Although the following description is related generally to the transition of maps during the arrival and/or departure of a mobile platform, such as a commercial aircraft, it will be understood that the map transition system, as described and claimed herein, is applicable to any type of mobile platform (such as an aircraft, ship, spacecraft, train or land-based motor vehicle). Further, the system and method described herein can be implemented in various other applications besides the arrival and departure of the mobile platform, and for example, could be used with a commercial marine vessel to transition between the arrival and/or departure of the marine vessel in a harbor. As used herein, the term module refers to an application specific integrated circuit (ASIC), an electronic circuit, a processor (shared, dedicated, or group) and memory that executes one or more software or firmware programs, a combinational logic circuit, and/or other suitable software, firmware programs or components that provide the described functionality. Therefore, it will be understood that the following discussions are not intended to limit the scope of the appended claims.

Figure 1:
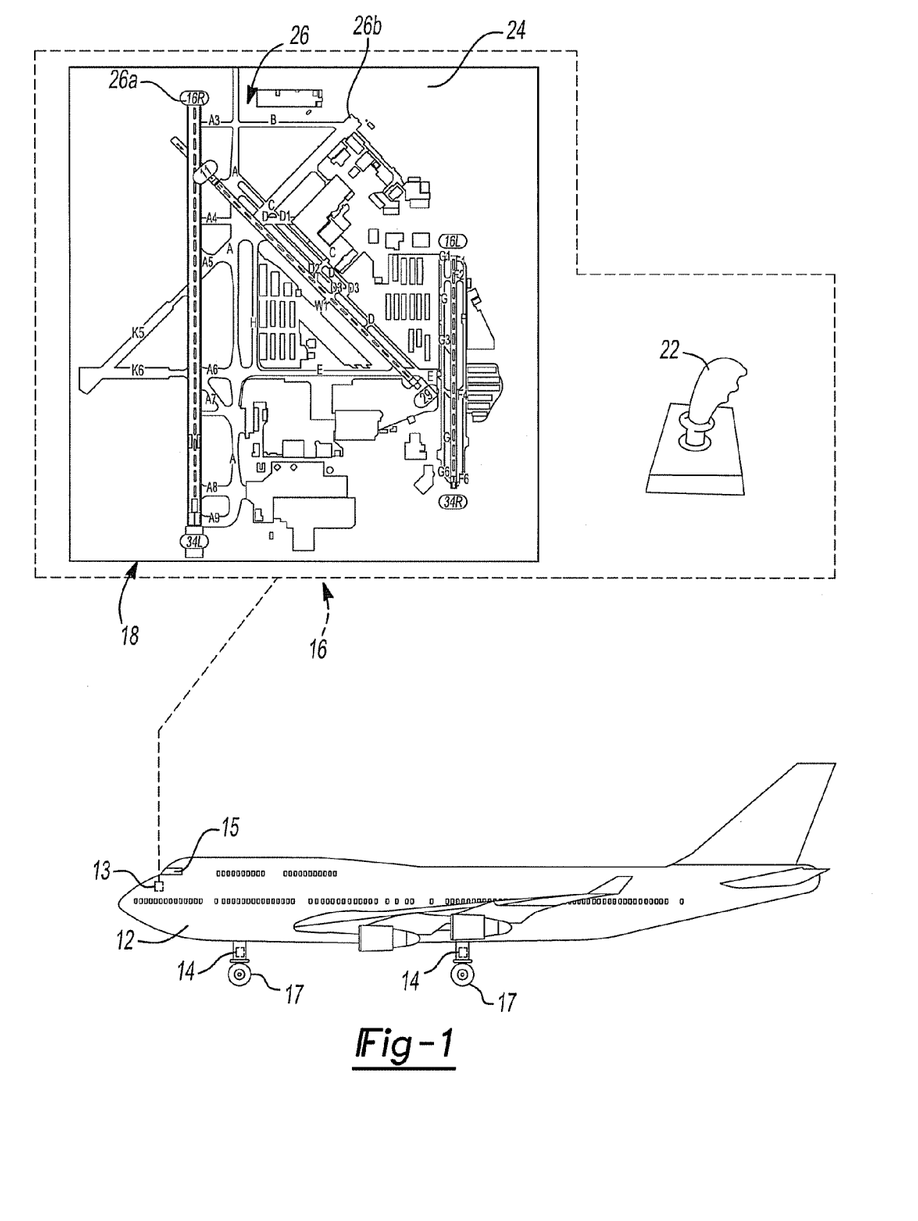
FIG. 1 is a schematic view of a mobile platform incorporating an aeronautical display according to the principles of the present disclosure.

With reference to FIG. 1, an aircraft 10 is shown. The aircraft 10 includes a fuselage 12. The fuselage 12 includes a speed sensor 13, a weight on wheels sensor or weight sensor 14, and defines a cockpit 15. The speed sensor 13 provides a speed of the aircraft 10, in meters per second, for example, to at least one control system, as will be discussed herein. The weight sensor 14 provides a weight on one or more wheels 17 of the aircraft 10, in kilograms or pounds, for example, to at least one control system, as will be discussed. It should be noted, that the position of both the speed sensor 13 and the weight sensor 14 on the aircraft 10 is merely exemplary, as the speed sensor 13 and weight sensor 14 could be located at any desired location on the aircraft 10, and further, the speed and weight of the aircraft 10 could be provided from other control systems. Based on the weight provided by the weight sensor 14, it may be determined if the aircraft 10 has landed on a runway or if the aircraft 10 has left the runway, as will be discussed further herein.

The cockpit 15 includes a display system 16. The display system 16 includes a graphical user interface (GUI) 18 that is controlled by a display control module 20. It will be understood, that although the display system 16 is shown as being mounted within the cockpit 15, the display system 16 could be a portable system, such as a hand-held display or a mountable portable device. In addition, it will be understood, that although the display system 16 will be described as having one GUI 18, the display system 16 could have a plurality of GUIs that are associated with the display system 16.

Figure 2:
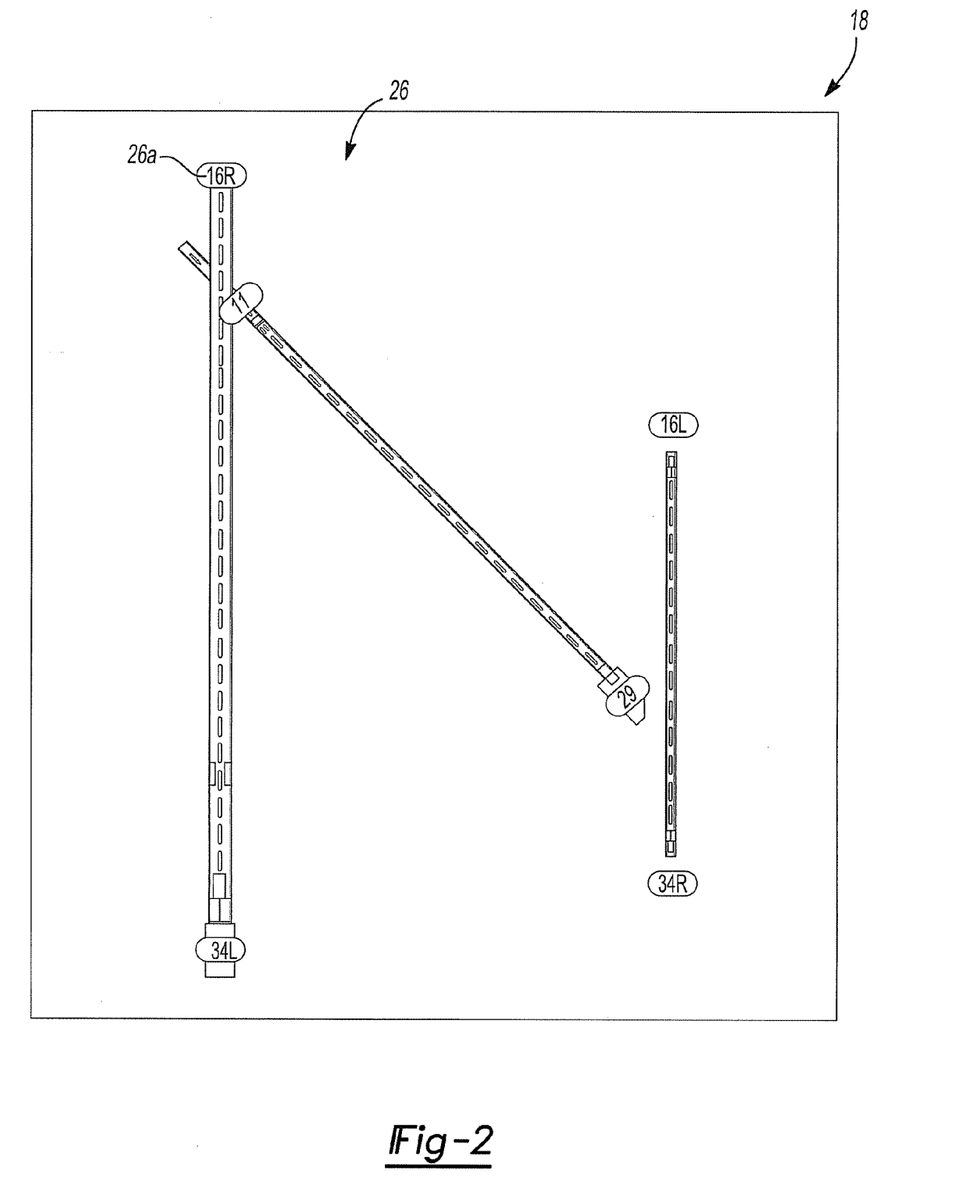
FIG. 2 is an exemplary view of the aeronautical display with image data displayed at a selected opacity according to the present disclosure.
Figure 3:
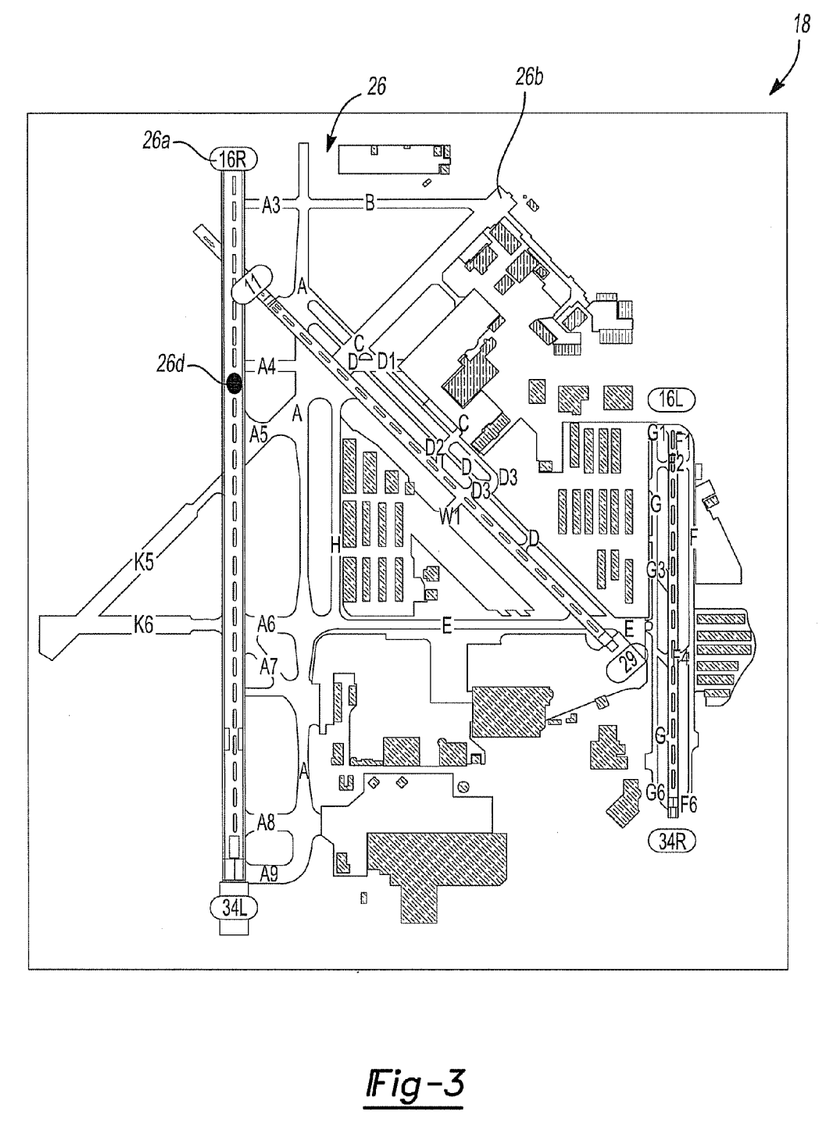
FIG. 3 is an exemplary view of the aeronautical display with image data displayed at a selected opacity according to the present disclosure.
Figure 4:
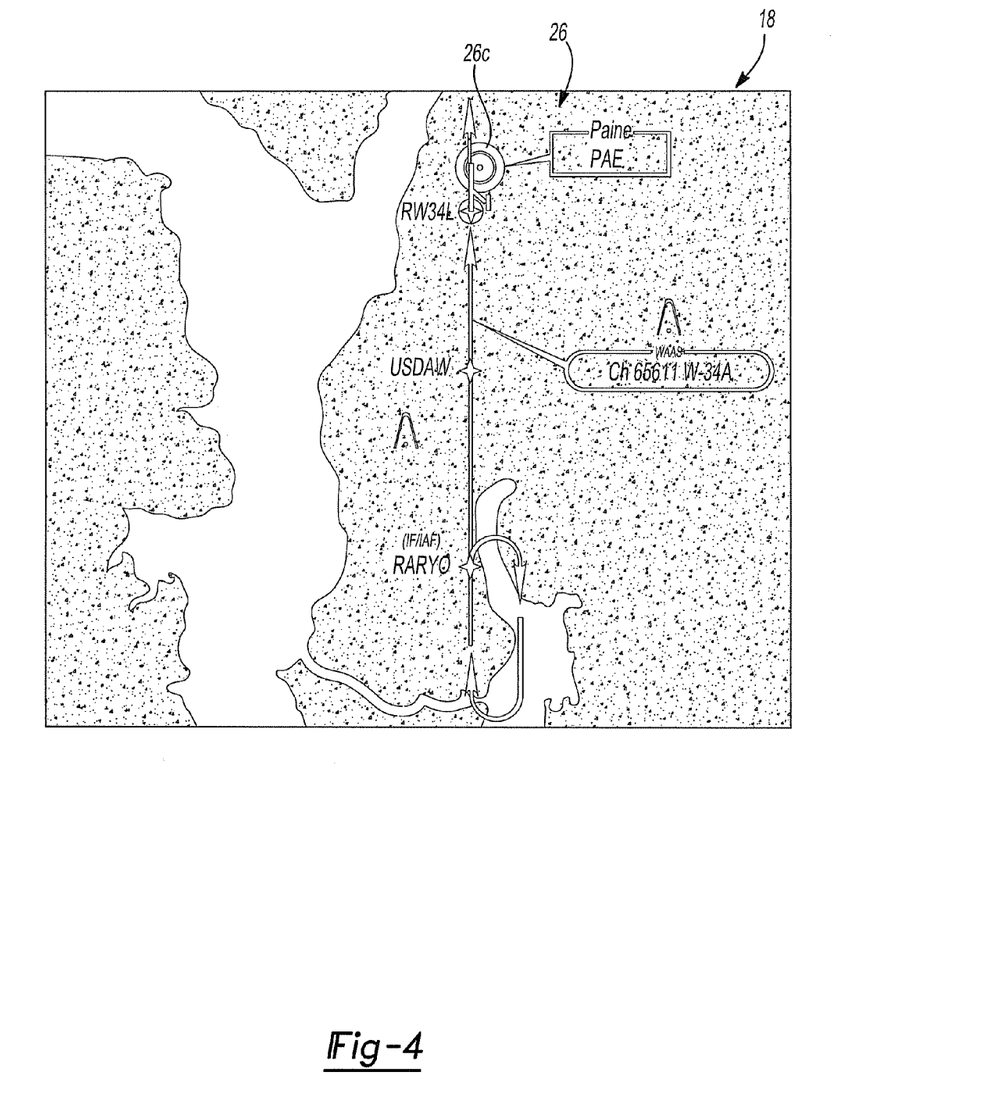
FIG. 4 is an exemplary view of the aeronautical display with image data displayed at a selected opacity according to the present disclosure.

The GUI 18 receives a user input through a user input device 22 and displays navigation display data 26. The user input device 22 may comprise a touch screen, a touch pen, a keyboard, a joystick, a mouse or any other suitable user input device. The user input device 22 may be used by the user to manipulate the navigation display data 26 displayed on the GUI 18, such as to zoom, pan, or otherwise modify the navigation display data 26 on the GUI 18. For example, the GUI 18 may include one or more user input devices 22 to receive the user input, such as a zoom input device, a rotate input device and one or more pan user input devices to manipulate the image on the GUI 18 (not specifically shown). The navigation display data 26 may include various types of navigational content, and for example, may comprise an aeronautical map associated with an airport. As a further example, the navigation display data 26 may include a map of one or more runways 26a associated with the airport, as shown in FIG. 2, or the map of the runways 26a with additional airport detail data 26b, as shown in FIG. 3. Further, the navigation display data 26 may include approach data 26c that includes a procedure for approaching the airport, as shown in FIG. 4, or departure procedure data (not shown). It should be noted that the navigation display data 26 illustrated herein is exemplary and the navigation display data 26 may comprise any suitable navigation display data 26, such as a map of a city and city detail. Further, although the navigation display data 26 is illustrated herein as having a clear background for clarity, the navigation display data 26 could have a dark background, which may reduce glare and distractions from the GUI 18, if desired, as shown in FIG. 3. Furthermore, although the navigation display data 26 is illustrated as 2-dimensional or 2D images from a top-down or top view, it will be understood that the navigation display data 26 could comprise 3-dimensional or 3D image at a variety of views or 2D images at a variety of views, if desired, such as views generated by 3D synthetic vision systems. As will be discussed, the display control module 20 may adjust the opacity of the navigation display data 26 such as the map of runways 26a, the airport detail data 26b and/or the approach data 26c, displayed on the GUI 18. The navigation display data 26 may also include an indicator 26d to graphically illustrate a position of the aircraft 10 relative to the navigational data 26, as shown in FIG. 2. The indicator 26d may comprise any suitable graphical representation of the aircraft 10, such as an aircraft icon, a sphere, circle, arrow, etc.

Figure 5:
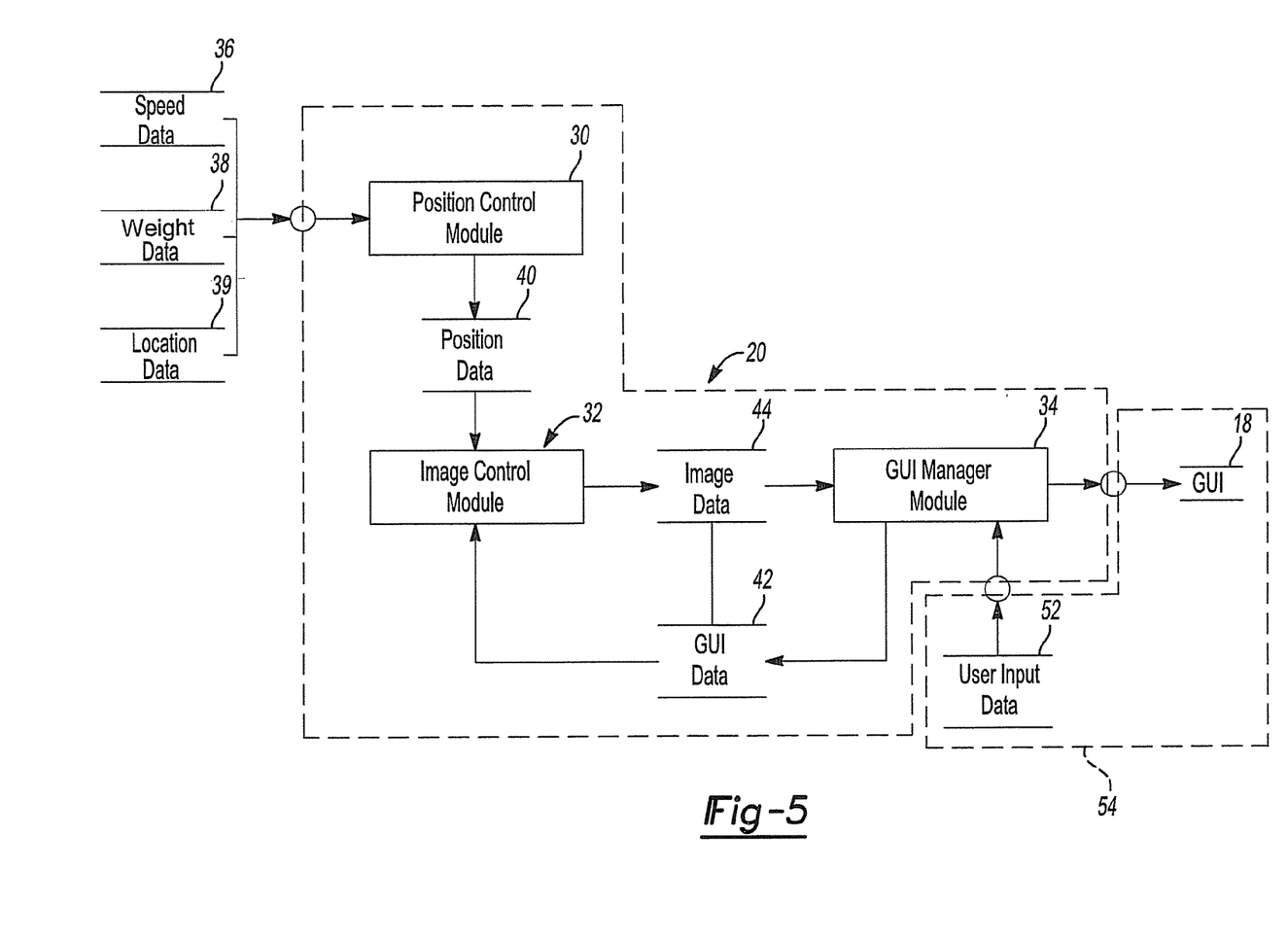
FIG. 5 is a dataflow diagram illustrating an exemplary display control module for the aeronautical display of the present disclosure.

With reference to FIG. 5, the display control module 20 for the GUI 18 is shown in accordance with an embodiment of the present disclosure. As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 5, a dataflow diagram illustrates various components of a control system that is embedded within the display control module 20. Various embodiments of the display control module 20 may include any number of sub-modules embedded within the display control module 20. The sub-modules shown in FIG. 5 may be combined and/or further partitioned to similarly control the display of the navigation display data 26. Inputs to the display control module 20 may be received from other control modules (not shown) within the aircraft 10, and/or determined by other sub-modules (not shown) within the display control module 20 (not shown). In the embodiment illustrated in FIG. 5, the display control module 20 includes a position control module 30, an image control module 32 and a GUI manager module 34.

The position control module 30 receives as input speed data 36, weight data 38 and location data 39. The speed data 36 comprises the speed of the aircraft 10, which may be provided by the speed sensor 13. The weight data 38 comprises the weight on the wheels 17 of the aircraft 10 provided by the weight sensor 14. The location data 39 comprises a location of the aircraft 10, and may include an airport that comprises an origin or destination of a flight plan for the aircraft 10. Based on the speed data 36, the weight data 38 and the location data 39, the position control module 30 sets position data 40 for the image control module 32. The position data 40 may comprise the speed of the aircraft 10 and a position of the aircraft 10 relative to a runway (such as landing on the runway, lifting off the runway, or landed on the runway) of the airport provided in the location data 39.

The image control module 32 receives as input the position data 40 from the position control module 30, and GUI data 42 from the GUI 18. The GUI data 42 may comprise a request to pan, rotate or zoom the navigation display data 26 on the GUI 18. Based on the position data 40 and the GUI data 42, the image control module 32 sets image data 44 for the GUI 18. The image data 44 comprises the navigation display data 26 for display on the GUI 18. As will be discussed, the opacity of the airport detail data 26b can range from 0% to 100%, in which 100% would result in 100% opacity of the airport detail data 26*b*, 50% would result in a 50% opacity of the airport detail data 26*b*, and 0% opacity would result in no airport detail data 26*b* being displayed on the GUI 18 With reference to FIG. 6, a dataflow diagram illustrates an exemplary image control system that may be embedded within the image control module 32. The image control module 32 includes an image generator control module 46 and a navigation map datastore or map datastore 48.

Figure 6:
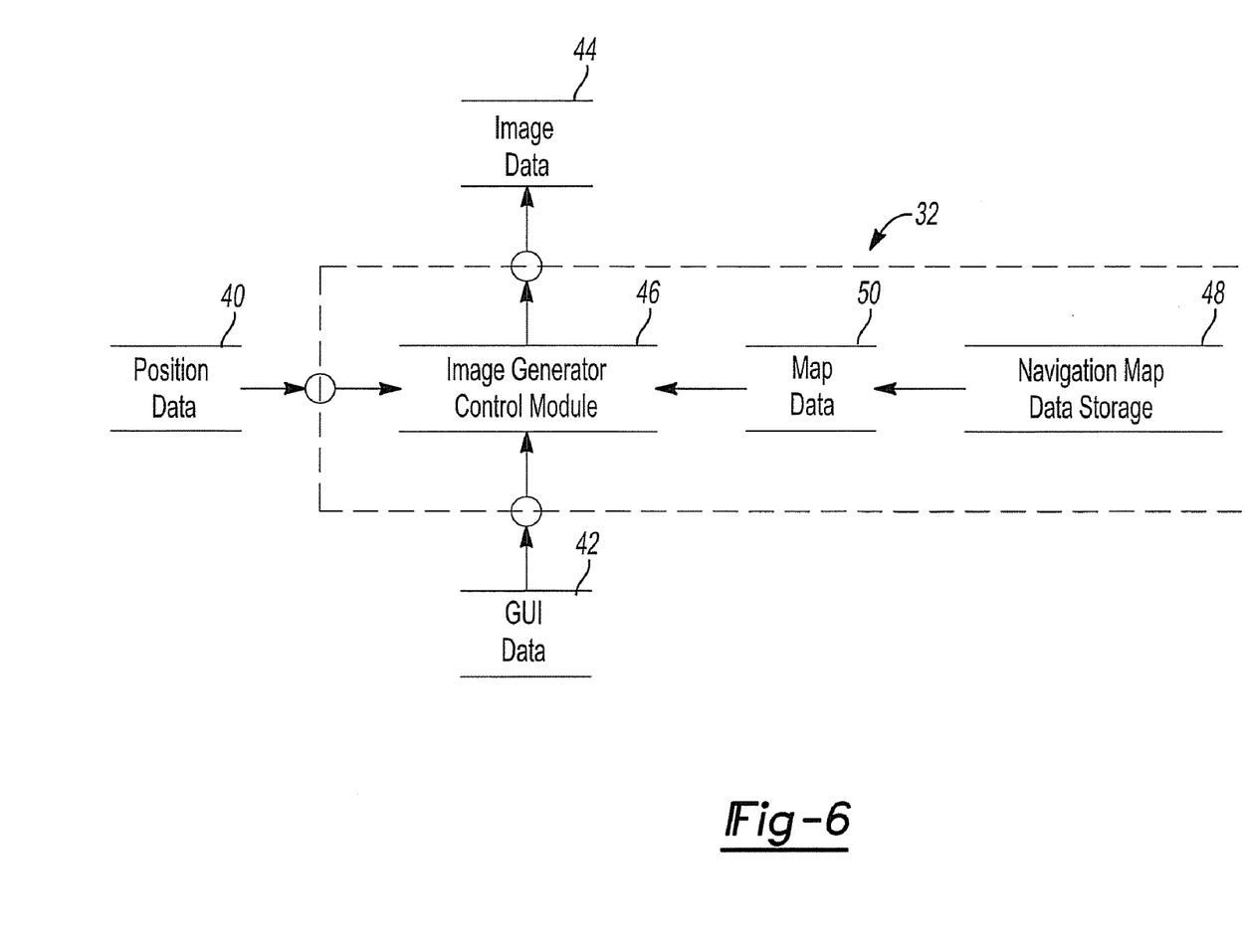
FIG. 6 is a dataflow diagram illustrating an exemplary image control module of the display control module of FIG. 5.

The image generator control module 46 receives as input the position data 40 from the position control module 30, the GUI data 42 from the GUI 18, and navigation map or map data 50 from the map datastore 48. The GUI data 42 may comprise a request to zoom, pan or otherwise manipulate the navigation display data 26 displayed on the GUI 18 as received from the user input device 22. The map data 50 comprises a map associated with the origin or destination airport of the aircraft 10. The map datastore 48 provides the map data 50 to the image generator control module 46. The map datastore 48 may comprise one or more data storage devices and may be at least one of random access memory (RAM), read only memory (ROM), a cache, a stack, or the like which may temporarily or permanently store electronic data. The map datastore 48 stores electronic data associated with the airports to which the aircraft 10 may depart or arrive, such as the map of the runways 26*a*, the airport detail data 26*b*, the approach data 26*c*, the departure data and/or the indicator 26*d*. Based on the position data 40, as will be discussed, the image generator control module 46 queries the map datastore 48 for the most appropriate map for display as the navigation display data 26 on the GUI 18, which is provided as the map data 50. Given the position data 40, the GUI data 42 and the map data 50, the image generator control module 46 outputs the image data 44 for the GUI manager module 34.

With reference back to FIG. 5, the GUI manager module 34 receives as input the image data 44, and outputs the GUI 18. The GUI manager module 34 also receives as input user input data 52. Generally, the GUI 18 and user input data 52 comprise a GUI control panel 54 that creates the GUI 18. The GUI 18 is any suitable GUI, and comprises any number of GUIs to display the image data 44. The GUI manager module 34, upon receipt of the image data 44, outputs the GUI 18 to display the image data 44. As will be discussed, the image data 44 displayed on the GUI 18 may be transitioned, utilizing alpha blending, for example, to output the navigation display data 26 on the GUI 18 in a manner that does not distract the operator. Further, upon receipt of the user input data 52, provided through the user input device 22, the GUI manager module 34 sets the GUI data 42 for the image control module 32. The user input data 52 may comprise a request to manipulate the navigation display data 26 displayed on the GUI 18, such as a request made via the zoom input device 22*a*, the rotate input device 22*b* or the pan input devices 22*c*.

Figure 7:
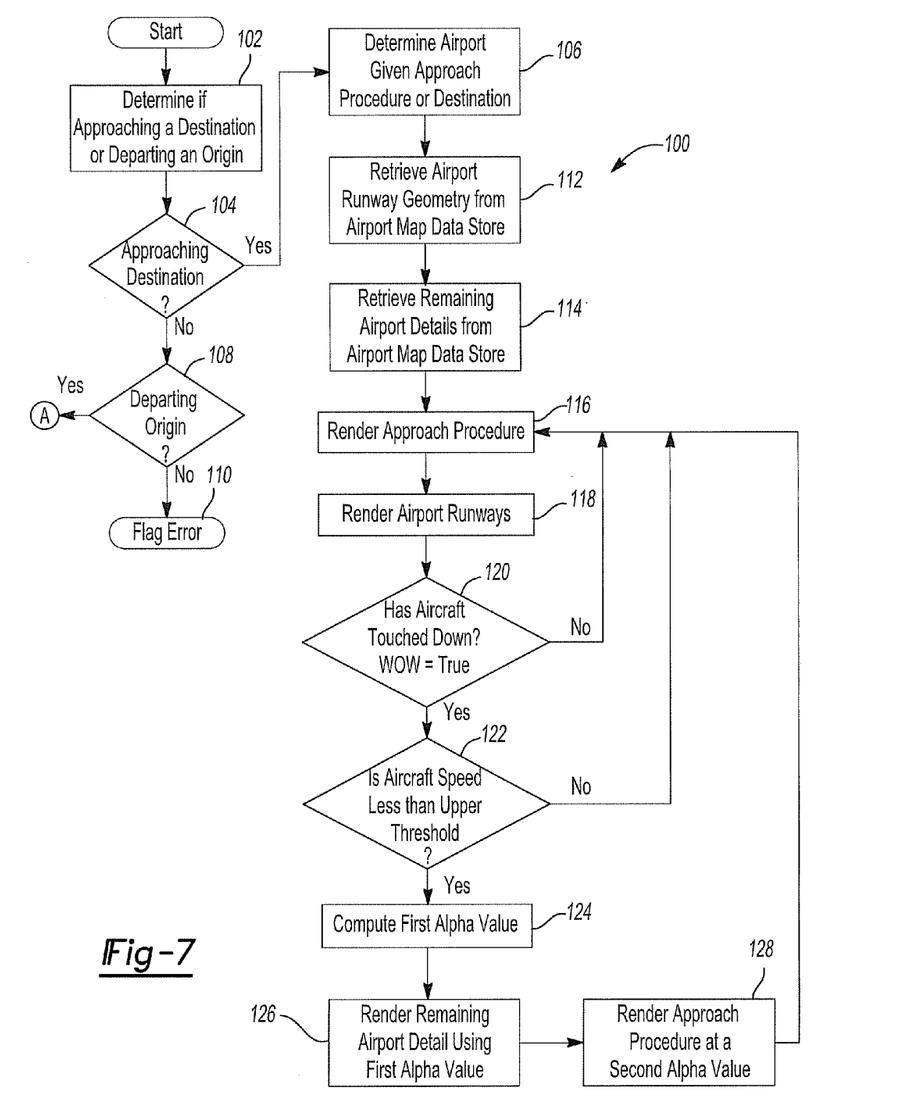
FIG. 7 is a flowchart illustrating an operational sequence for the module of FIG. 5.
Figure 8:
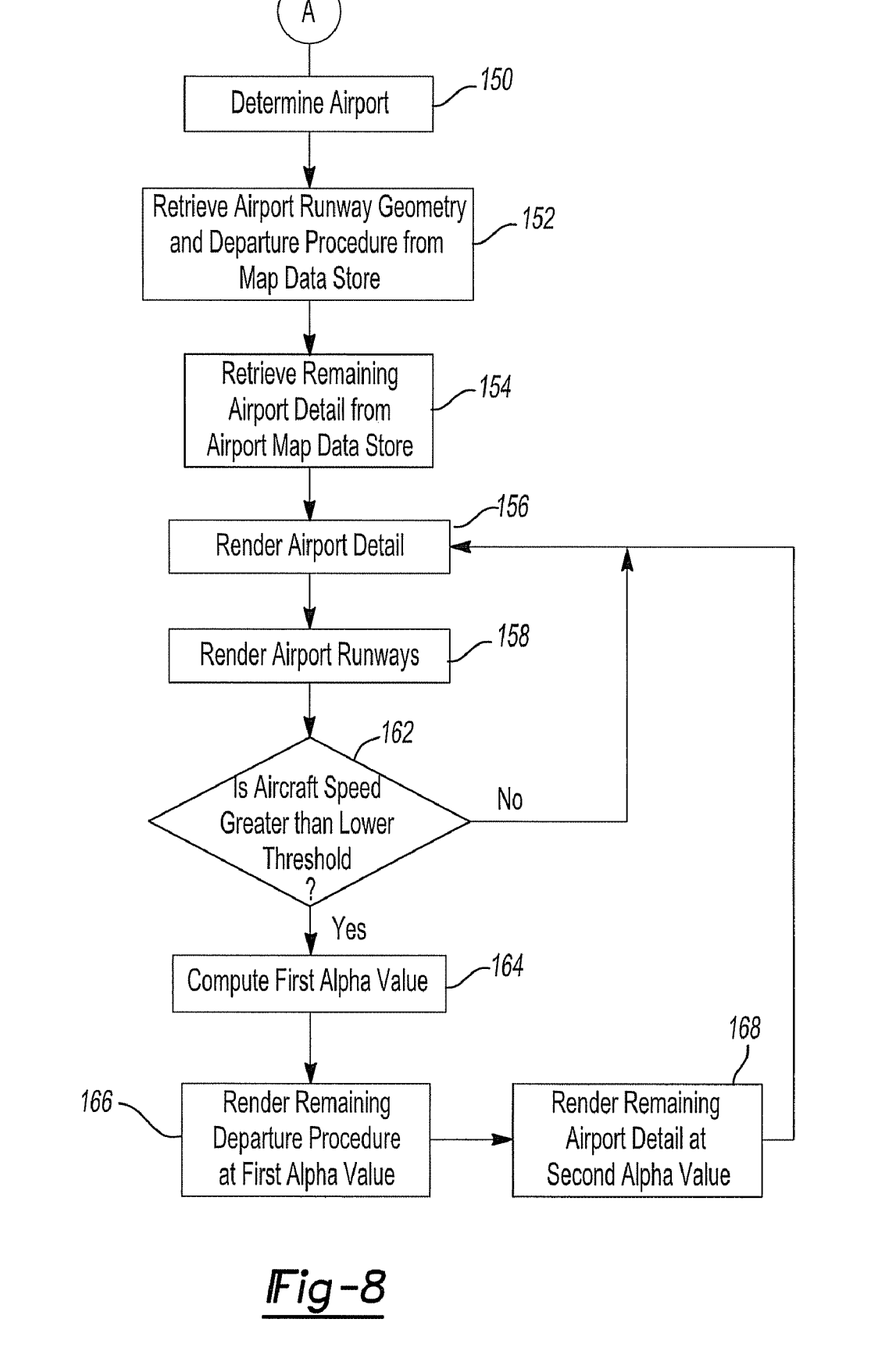
FIG. 8 is a flowchart illustrating an operational sequence for the module of FIG. 5.

With reference to FIG. 7, a process flow diagram illustrates an exemplary operational sequence 100 performed by the display control module 20 to generate compute or transition the image data 44 for display on the GUI 18. The foregoing operational sequence 100 will be discussed with reference to the commercial aircraft 10, however, it will be understood that the operational sequence 100 could be employed by a commercial marine vessel, for example. In operation 102, the method determines, based on the position data 40, if the aircraft 10 is approaching or departing from an airport. At operation 104, if the aircraft 10 is approaching the destination, then the method goes to operation 106. If the aircraft 10 is not approaching the destination, then the method goes to operation 108. At operation 108, the method determines if the aircraft 10 is departing from the airport associated with the origin of the flight plan for the aircraft 10. If the aircraft 10 is departing from the airport, then the method goes to A on FIG. 8. Otherwise, the method flags an error at operation 110.

At operation 106, the method determines the airport given the position data 40. At operation 112, the method retrieves the map data 50 that comprises the map of the runways 26*a* and the approach data 26*c* for the given airport from the map datastore 48. Then, at operation 114, the method retrieves map data 50 that comprises the airport detail data 26*b* from the map datastore 48. At operation 116, the method renders the approach procedure as approach data 26*c* on the GUI 18. The approach procedure may comprise instructions on how to land on the runway. The approach procedure may provide direction, altitudes, etc. At operation 118, the method renders the map of the runways 26*a* on the GUI 18. Then, at operation 120, the method determines if the aircraft 10 has touched down or landed on one of the runways of the airport. The method determines if the aircraft 10 has touched down based on whether the weight sensor 14 reports weight data 38 that indicates a weight on at least one of the wheels 17. If the aircraft 10 has not touched down, then the method loops to operation 116.

Otherwise, if the aircraft 10 has touched down, then in operation 122, the method determines if the speed data 36 of the aircraft 10 is less than an upper threshold. The upper threshold comprises a speed value that indicates that the aircraft 10 has just touched down on the runway, and may vary depending upon the type or size of the aircraft. For example, a small aircraft 10 may have an upper threshold of between about 35 knots to 55 knots, such as about 46 knots, while a large aircraft 10 might have an upper threshold that ranges between 100 knots to 150 knots, such as about 130 knots. If the speed data 36 is not less than the upper threshold, then the method loops to operation 116.

If the speed data 36 is less than the upper threshold, then in operation 124, the method computes a first alpha value to transition or alpha blend the remaining airport detail data 26*b* into the navigation display data 26 on the GUI 18. The first alpha value comprises a value from 0.0 to 1.0 equivalent to the opacity of the airport detail data 26*b* that is displayed on the GUI 18, and thus, the alpha value multiplied by 100 comprises a percentage of opacity of the airport detail data 26*b*. The first alpha value may vary according to a suitable mathematical interpolation algorithm, such as a linear interpolation, based on the speed of the aircraft 10. For example purposes only, a first alpha value may be computed by the following:

$$\text{First Alpha Value} = \frac{\left( (UpperLimit - LowerLimit) - \atop (Speed - LowerLimit) \right)}{UpperLimit - LowerLimit}$$

Wherein, the speed comprises the speed data 36 of the aircraft 10, and the lower threshold comprises a speed of the aircraft 10 that is indicative that the aircraft 10 has slowed to the point such that the display of the airport detail data 26*b* facilitates the navigation of the aircraft 10 about the airport. The lower threshold may be a value that varies depending upon the type or size of the aircraft 10. For example, a small aircraft 10 may have a lower threshold that ranges between about 30 knots to 10 knots, while a larger aircraft 10 may have a lower threshold that ranges between about 50 knots to 20 knots.

Figure 9:
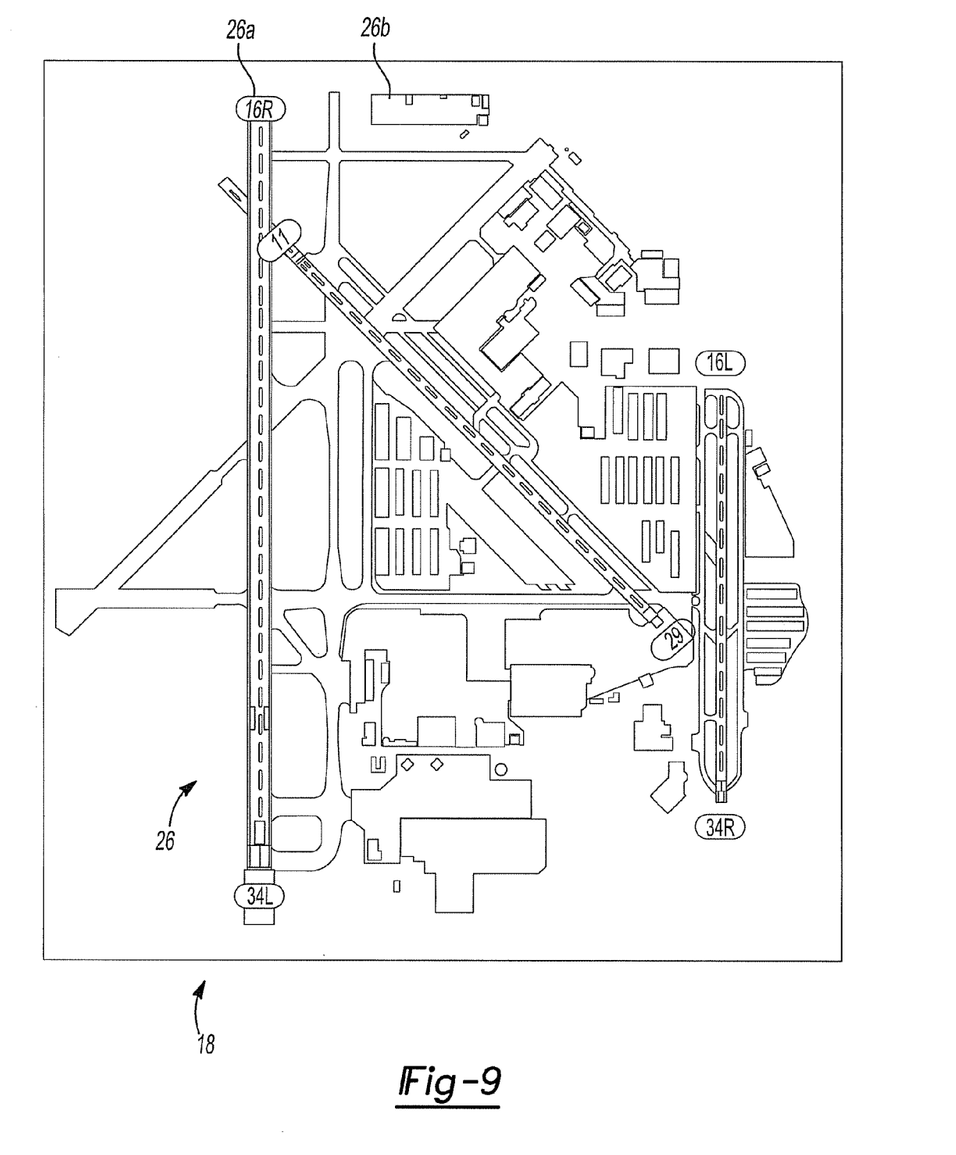
FIG. 9 is an exemplary view of the aeronautical display with image data displayed at a selected opacity according to the present disclosure.
Figure 10:
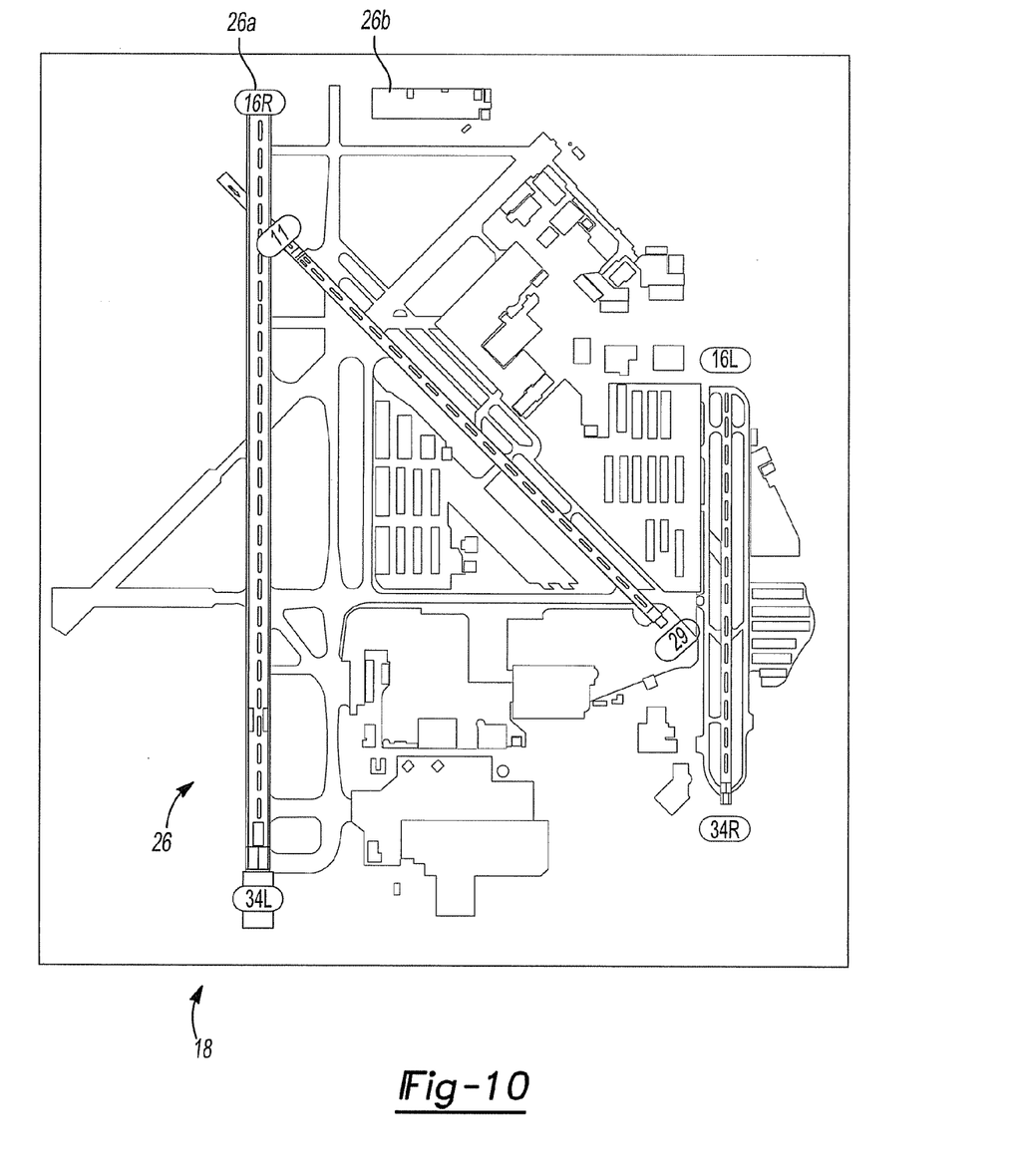
FIG. 10 is an exemplary view of the aeronautical display with image data displayed at a selected opacity according to the present disclosure.
Figure 11:
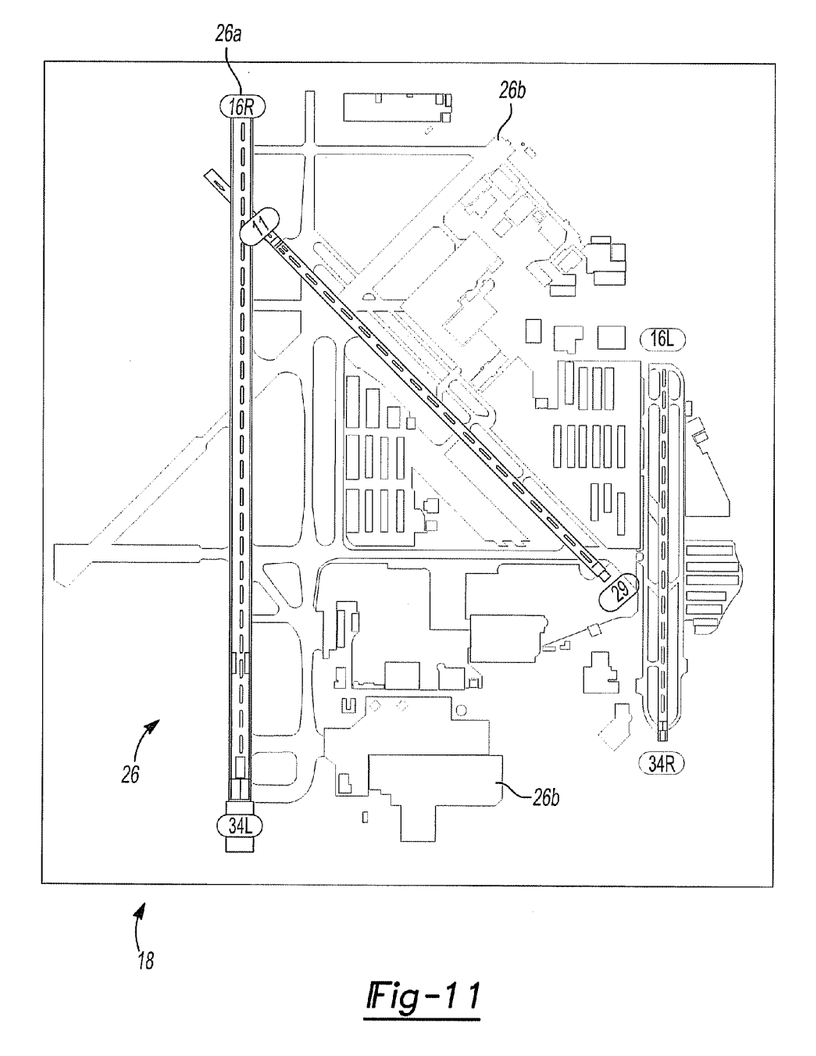
FIG. 11 is an exemplary view of the aeronautical display with image data displayed at a selected opacity according to the present disclosure.

Based on the computed first alpha value, the method transitions or renders the remaining airport detail data 26b for display on the GUI 18 in operation 126. For example, if the first alpha value comprises a value about greater than or about equal to 1, then the method renders all of the airport detail data 26b opaque as shown in FIG. 3. As a further example, if the first alpha value comprises about 0.75, then the method renders the airport detail data 26b at about 75% opaque (25% translucent), as shown in FIG. 9. Further, if the first alpha value comprises about 0.5, for example, then the method renders the airport detail data 26b at about 50% opaque (50% translucent) as shown in FIG. 10. As another example, the first alpha value may comprise about 0.25, and the method may render the airport detail data 26b at about 25% opaque (75% translucent) as shown in FIG. 11. Further, for example, if the alpha value is about zero, then the method renders the airport detail data 26b at about 0% (100% translucent) such that only the map of the runways 26a is visible, as shown in FIG. 2. Thus, the first alpha value may denote the translucency or opacity associated with the airport detail data 26b provided in the navigation display data 26 that is alpha blended with the initial or first navigation display data 26 displayed on the GUI 18.

In operation 128, the method computes a second alpha value to transition or render the approach data 26c onto the GUI 18. For example purposes only, the second alpha value comprises:

Second Alpha Value=1−FirstAlphaValue

Wherein the first alpha value is the first alpha value computed in operation 124. The second alpha value is used to blend the approach data 26c out of the navigation display data 26 displayed on the GUI 18. For example, based on the second alpha value, which may range from 1.0 to 0.0, the approach data 26c may or may not be displayed on the GUI 18, as discussed with regard to the first alpha value. Given the second alpha value, the method renders the approach data 26c on the GUI 18 at the appropriate translucency or opacity. Then, the method loops to operation 116.

With reference now to FIG. 7, if the aircraft 10 is departing from an airport, at operation 150, the method determines the airport based on the position data 40. At operation 152, the method retrieves the map data 50 that comprises the runway data 26a for the given airport from the map datastore 48. Then, at operation 154, the method retrieves map data 50 that comprises the airport detail data 26b from the map datastore 48. At operation 156, the method renders the airport geometry on the GUI 18, and at operation 158, the method renders the map of the runways 26a on the GUI 18, as illustrated in FIG. 3.

In operation 162, the method determines if the speed data 36 of the aircraft 10 is greater than the lower threshold. It should be noted that the lower threshold for departures may be about greater than, about less than or about equal to the upper threshold for the arrival speed of the aircraft 10. If the speed data 36 is not greater than the lower threshold, then the method loops to operation 156. If the speed data 36 is greater than the lower threshold, then in operation 164, the method computes the first alpha value. The first alpha value comprises the opacity of the airport detail data 26b displayed on the navigation display data 26, as discussed herein. At operation 164, based on the computed first alpha value, the method renders the departure procedure data on the GUI 18 at the computed translucency or opacity based on the first alpha value, as discussed previously herein. In operation 168, the method computes the second alpha value, as discussed herein, and renders the airport detail data 26b at the translucency or opacity computed from the second alpha value. Then, the method loops operation 156.

Thus, in operation, the display control module 20 enables the automatic transitioning between various navigation display data 26 such as runway data 26a, airport detail data 26b, approach data 26c and departure data without user interaction or user distraction, based upon the position of the aircraft 10. In this regard, when the aircraft 10 is approaching or taking-off from a runway, the operators of the aircraft 10 may need to view the runway data 26a on the display 16, and not the airport detail data 26b. Conversely, when the aircraft 10 is landing on a ground surface, such as a runway, then the operators of the aircraft 10 may need to view the runway data 26a and at least a portion of the airport detail data 26b. Thus, the present disclosure provides a display control system for a mobile platform, such as an aircraft, that smoothly and automatically transitions various navigational data, such as map data, during the movement of the mobile platform, and thereby reduces the need for manually switching between multiple maps during the navigation of the mobile platform while preventing user distractions.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for automatically transitioning navigation display data on a mobile platform comprising:
    a source of navigation display data;
    an image control module that generates image data from the navigation display data based on a position of the mobile platform, the image data including at least one first navigation display data at a first opacity and at least one second navigation display data at a second opacity, the second opacity computed based on the position of the mobile platform;
    a display device disposed within the mobile platform that displays the image data; and
    wherein the second opacity is generated if a sensed weight of the mobile platform indicates that the mobile platform is on a ground surface.

2. The system of claim 1, wherein the first opacity is about 100 percent such that a fully opaque image is rendered based on the first navigation display data.

3. The system of claim 1, wherein the second opacity ranges from about zero to about 100 percent such that the opacity of the image rendered based on the second navigation display data varies based on the position of the mobile platform.

4. The system of claim 3, further comprising:
a speed sensor coupled to the mobile platform that generates a speed of the mobile platform;
a weight sensor coupled to at least one wheel of the mobile platform that provides a signal indicative of a weight of the mobile platform observed at the at least one wheel;
a source of location data that provides a geographic location of the mobile platform; and
a position control module that computes the position of the mobile platform based on at least one of the speed, weight and location of the mobile platform.

5. The system of claim 4, wherein the image control module generates the second opacity based on the speed and weight-on-wheels state of the mobile platform.

6. The system of claim 5, wherein if the mobile platform is on the ground surface, the second opacity varies mathematically based on the speed of the mobile platform.

7. The system of claim 1, further comprising a graphical user interface (GUI) manager module that populates a graphical user interface (GUI) to display the image data.

8. A method of automatically transitioning navigation data on a display of an aircraft comprising:
computing a location of the aircraft relative to an origin or a destination of the aircraft;
rendering a first image on the display at a first opacity based on the location of the mobile platform;
determining a speed of the aircraft;
determining if the aircraft is on a ground surface;
transitioning to a second image on the display at a second opacity based on the speed of the aircraft and whether the aircraft is on the ground surface; and
computing the second opacity based at least on a speed of the aircraft while the aircraft is travelling on the ground surface.

9. The method of claim 8, wherein determining if the aircraft is on a ground surface further comprises:
determining if the aircraft is on a ground surface based on a signal received from a weight sensor coupled to one or more wheels of the aircraft.

10. The method of claim 8, wherein rendering the first image on the display at the first opacity further comprises:
rendering the first image at about 100 percent opacity.

11. The method of claim 10, wherein rendering the first image on the display at the first opacity further comprises:
rendering a runway map associated with an airport that is the origin or the destination of the aircraft.

12. The method of claim 8, wherein computing the second opacity further comprises:
determining a mathematical relationship between the speed of the aircraft and the second opacity; and
incrementing the second opacity between about zero percent to 100 percent based on the speed of the aircraft.

13. The method of claim 8, wherein transitioning to the second image on the display at the second opacity further comprises:
transitioning to airport detail data associated with an airport that is the origin or the destination of the aircraft; and
transitioning to at least one of approach data or departure data associated with airport that is the origin or destination of the aircraft.

14. The method of claim 13, further comprising:
computing a third opacity based on the second opacity;
transitioning to the approach data at the third opacity if the airport detail data is at the second opacity; and
transitioning to the remaining airport detail at the third opacity if the departure data is at the second opacity.

15. An aircraft comprising:
a fuselage;
one or more wheels coupled to the fuselage to support the fuselage on a ground surface;
a cockpit located within the fuselage;
a display located within the cockpit, the display controlled by a display control system, the display control system including:
a position control module that computes position data for the aircraft, the position data including a speed of the aircraft and a sensed weight of the aircraft on the one or more wheels of the aircraft; and
an image control module that generates image data for display on the display based on the position data, the image data including at least one navigation display data for display at a variable opacity which is automatically computed based on the position of the aircraft and a speed of the aircraft while the aircraft is sensed to be travelling on the ground surface.

16. The aircraft of claim 15, wherein the image data further comprises:
at least one first navigation display data at a first opacity;
at least one second navigation display data at a second opacity; and
wherein, the second opacity is computed based on the speed and the sensed weight-on-wheels of the aircraft.

17. The aircraft of claim 16, wherein the first opacity is about 100 percent such that a fully opaque image is displayed based on the first navigation display data, and the second opacity ranges from about zero to about 100 percent such that the opacity of the image displayed based on the second navigation data varies based on the speed of the mobile platform.

18. The aircraft of claim 17, wherein the second opacity is generated if the weight on the one of more wheels of the mobile platform indicates that the mobile platform is on the ground surface.

19. The aircraft of claim 18, wherein the first image comprises a runway map associated with an airport that is the origin or destination of the aircraft and the second image comprises airport detail, and an approach procedure or a departure procedure associated with the airport that is the origin or destination of the aircraft.

* * * * *